(12) United States Patent
Kurihara et al.

(10) Patent No.: US 6,373,435 B2
(45) Date of Patent: Apr. 16, 2002

(54) RADIO DIRECTION AND POSITION FINDING APPARATUS

(75) Inventors: Tsugihiro Kurihara, Fujisawa; Hayato Akazawa, Yokohama, both of (JP)

(73) Assignee: Matsushita Electric Industrial Co., Ltd., Kadoma (JP)

( * ) Notice: Subject to any disclaimer, the term of this patent is extended or adjusted under 35 U.S.C. 154(b) by 0 days.

(21) Appl. No.: 09/772,932

(22) Filed: Jan. 31, 2001

(30) Foreign Application Priority Data

Mar. 7, 2000 (JP) ............................................. 12-061351

(51) Int. Cl.[7] ................................................ G01S 5/02
(52) U.S. Cl. ........................ 342/430; 342/362; 342/427
(58) Field of Search ................................ 342/430, 362, 342/427

(56) References Cited

U.S. PATENT DOCUMENTS 5,526,001 A * 6/1996 Rose et al. .................. 342/442

* cited by examiner

Primary Examiner—Theodore M. Blum
(74) Attorney, Agent, or Firm—Wenderoth, Lind & Ponack, L.L.P.

(57) ABSTRACT

An object of the present invention is to provide a selective level measuring apparatus with wider dynamic range of effective value detection, compared with the range by a conventional one. The apparatus according to the present invention comprises a gain control means arranged before an effective value detection section for varying a gain by a control voltage, so that a signal level inputted into the effective value detection section may be kept to be constant level by the gain control means, and the signal level of the signal to be measured is measured and indicated through the control voltage. Performing such operations allows the selective level measuring apparatus for the effective value detection to secure a dynamic range defined by a variable quantity of the gain control means. Accordingly, the present invention provides the wider dynamic range of the effective value detection comparing with that by the conventional one.

5 Claims, 7 Drawing Sheets

RADIO DIRECTION AND POSITION FINDING APPARATUS

FIELD OF THE INVENTION

The present invention relates to a direction and position finding apparatus which receives an radio wave and determines a direction of arrival and a position of an emission source thereof with high accuracy.

DESCRIPTION OF THE PRIOR ART

One of the well-known basic direction finding apparatuses to detect a direction of arrival of radio wave is, for example, Yagi antenna which detects the direction of arrival of the radio wave using a directional antenna. Another direction finding apparatus is disclosed in the Japanese Patent Application No. H3-67789, which uses a non-directional antenna and two directional antennas to determine an approximate direction based on an output corresponding to a summing pattern of the two directional antenna patterns and another output from the non-directional antenna, and further to perform a direction finding based on the output corresponding to the summing pattern and another output corresponding to a differential pattern of the two directional antenna patterns.

Conventional direction finding apparatuses described above, however, can detect only a direction of arrival of radio wave. Further, because of a limited accuracy thereof in direction finding due to a beam width of the directional antenna, high accuracy of detection has not been obtained.

SUMMERY OF THE INVENTION

The present invention is made to solve the problems described above, and an object thereof is to provide a direction and position finding apparatus capable of not only detecting a direction of arrival of radio wave with high accuracy, but also performing a highly accurate position finding of an emission source thereof.

An invention defined in claim 1 of the present invention provides a direction and position finding apparatus comprising: a first directional antenna which rotates with a desired wave angle; a first phase sum and difference combining means for outputting a sum and a difference of outputs from said first directional antenna; a first differential gain control means for controlling a gain of the differential component of the output of said first directional antenna; a first receiving means for receiving the sum component from said first phase sum and difference combining means; a second receiving means for receiving an output from said first differential gain control means; a first subtraction means for subtracting one output from the other output of said first and said second receiving means; a first calculation means for determining a direction of arrival of radio wave based on an output from said first subtraction means; a second directional antenna which rotates with a desired wave angle; a second phase sum and difference combining means for outputting a sum and a difference of outputs of said second directional antenna; a second differential gain control means for controlling a gain of the differential component of the output from said second directional antenna; a third receiving means for receiving the sum component from said second phase sum and difference combining means; a fourth receiving means for receiving an output from said second differential gain control means; a second subtraction means for subtracting one output from the other output of said third and said fourth receiving means; a second calculation means for determining a direction of arrival of radio wave based on an output from said second subtraction means; and a position determining means for determining a position of an emission source of the radio wave based on the outputs from the first and the second calculation means; wherein said first directional antenna and said second directional antenna rotate interlockingly, and thereby, said apparatus constructed as described above provides an advantageous effect that it can determine the direction and the position of the emission source of the radio wave with high accuracy based on the summing output and the differential output of the outputs from the two directional antennas.

An invention defined in claim 2 of the present invention provides a direction and position finding apparatus in accordance with claim 1, in which said directional antennas use at least two vertical polarized waves, and thereby, said apparatus constructed as described above also provides an advantageous effect that it can determine the direction and the position of the emission source of the radio wave based on the summing outputs and the differential outputs of the outputs from the two vertical polarized wave antennas.

An invention defined in claim 3 of the present invention provides a direction and position finding apparatus in accordance with claim 1, in which said apparatus uses a vertical polarized wave directional antenna with acute horizontal directivity and a vertical polarized wave directional antenna with acute vertical directivity, and thereby, said apparatus constructed as described above also provides an advantageous effect that it can determine the direction and the position of the emission source of the radio wave based on the summing output and the differential output of the output from the vertical polarized wave directional antenna with acute vertical directivity and also by the summing output and the differential output of an antenna pattern of the vertical polarized wave directional antenna with acute horizontal directivity.

An invention defined in claim 4 of the present invention provides a direction and position finding apparatus in accordance with claim 1, in which each of said first and said second phase sum and difference combining means can vary a phase difference in the output from each said directional antennas, and thereby, said apparatus constructed as described above also provides an advantageous effect that, since a setting of the phase difference can be varied, said apparatus can determine the direction and the position of the emission source of the radio wave based on the summing output and the differential output of the output from the directional antenna, which have been generated as a resultant formed by shifting a phase difference.

An invention defined in claim 5 of the present invention provides a direction and position finding apparatus in accordance with claim 1, in which the position of the emission source of the radio wave is determined by controlling the gain of the differential component of the output from the directional antenna, and thereby, said apparatus constructed as described above also provides an advantageous effect that it can determine the direction of arrival of the radio wave by interlockingly rotating those two directional antennas to maximize the summing output and also determine the position of the emission source of the radio wave by controlling a wave angle while controlling a gain of the differential output.

DESCRIPTION OF THE PREFERRED EMBODIMENTS

Preferred embodiments of the present invention will now be described in detail with reference to the attached drawings.

Figure 1:
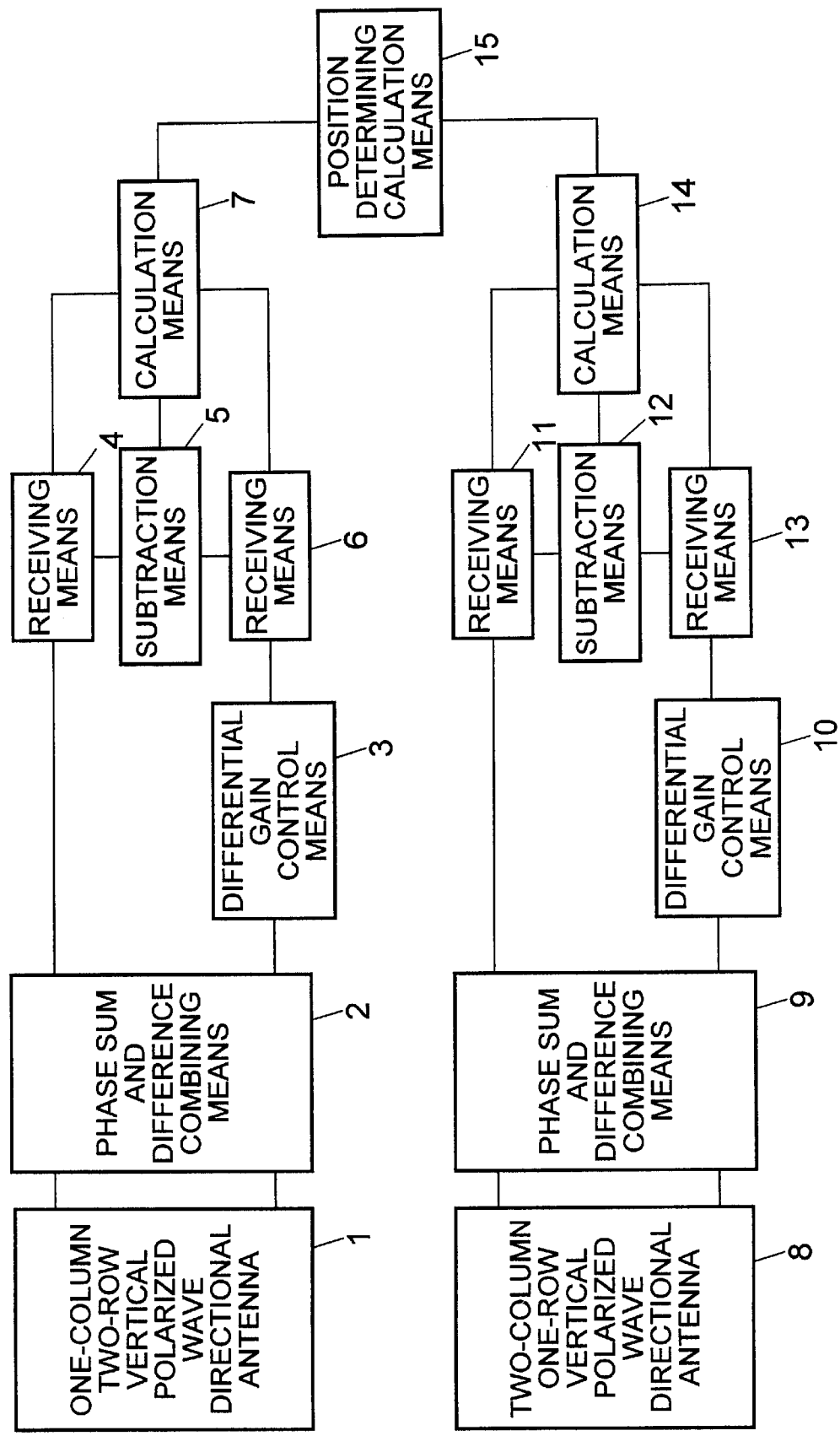
FIG. 1 is a block diagram illustrating a configuration of an embodiment of a direction and position finding apparatus according to the present invention.

FIG. 1 is a block diagram of a direction and position finding apparatus according to the present invention.

As shown in FIG. 1, this direction and position finding apparatus comprises a one-column two-row vertical polarized wave directional antenna 1 with acute vertical directivity and a two-column one-row vertical polarized wave directional antenna 8 with acute horizontal directivity. The directional antenna 1 and another directional antenna 8 can interlockingly rotate with respective predetermined wave angles. Each of phase sum and difference combining means 2 and 9 respectively receives a signal received by each of the directional antennas 1 and 8, and generates summing signal and differential signal of each of those two received signals to output them. Upon generating the summing signal and the differential signal, each of the phase sum and difference combining means 2 and 9 can respectively set the phase difference of each of these two directional antennas 1 and 8 to a desired value. Each of gain control means 3 and 10 respectively controls gain of the differential signal outputted from each of the phase sum and difference combining means 2 and 9. Each of receiving means 4 and 11 respectively detects the summing signal outputted from each of the phase sum and difference combining means 2 and 9, and each of receiving means 6 and 13 respectively detects the gain controlled differential signal outputted from each of the gain control means 3 and 10. Each of subtraction means 5 and 12 respectively calculates difference between the detected output from each of the receiving means 4 and 11 and that from each of the receiving means 6 and 13. Each of calculation means 7 and 14 respectively determines a direction of arrival of radio wave based on the output from each of the subtraction means 5 and 12 and each of these results is applied to a position determining means 15 to determine a position of an emission source of the radio wave.

Figure 2:
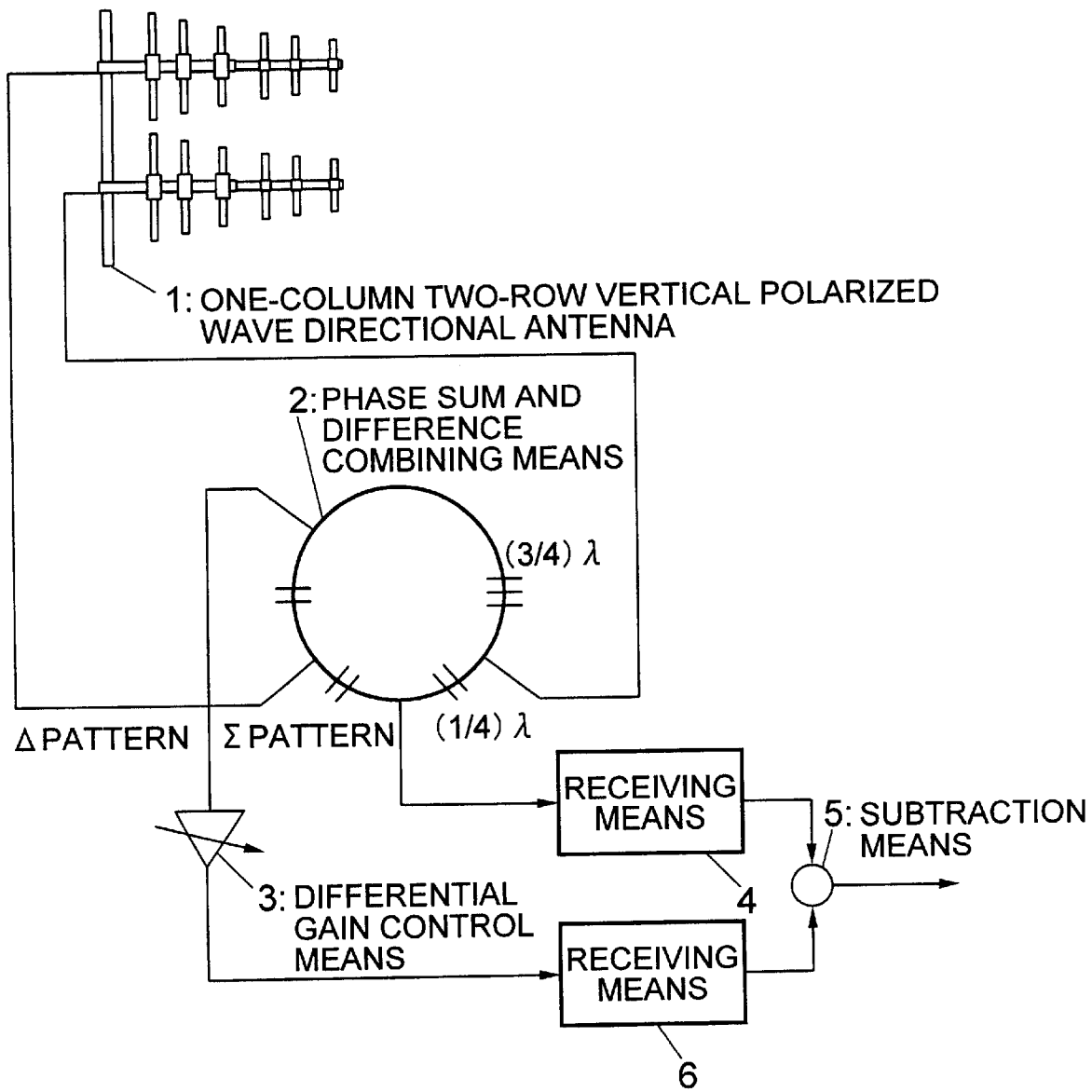
FIG. 2 is a block diagram illustrating a phase sum and difference combining means for calculating a Σ pattern and a Δ pattern of a directional pattern of a one-column two-row vertical polarized wave directional antenna and other means disposed before and after the combining means.
Figure 3:
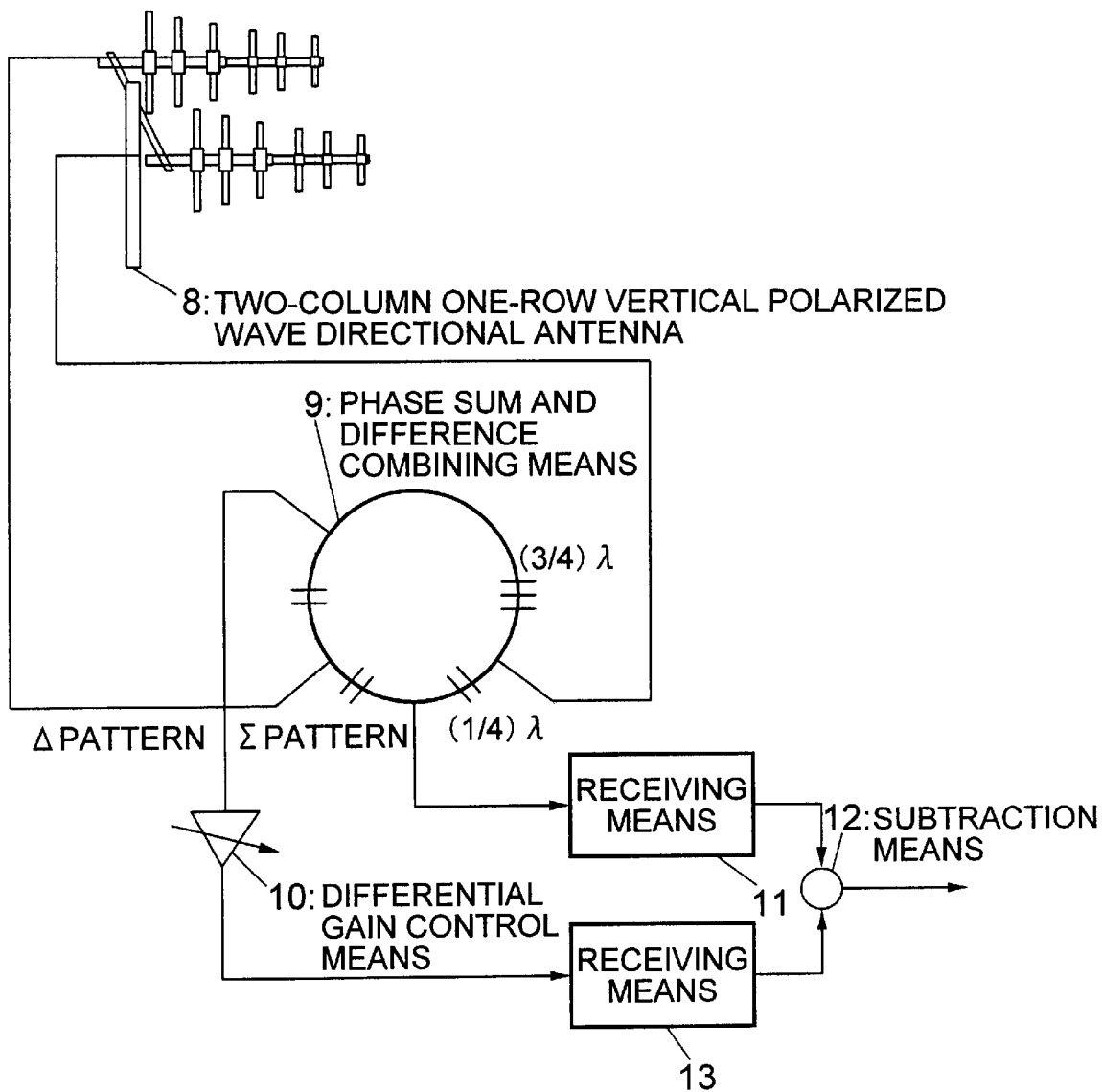
FIG. 3 is a block diagram illustrating a phase sum and difference combining means for calculating the Σ pattern and the Δ pattern of a directional pattern of a two-column one-row vertical polarized wave directional antenna and other means disposed before and after the combining means.

FIGS. 2 and 3 respectively depict cases where each of the phase sum and difference combining means 2 and 9 in FIG. 1 combines the signals received by the directional antenna 1 or 8 with the phases shifted to each other by λ/4 to form the summing signal, and with the phase shifted to each other by 3 λ/4 to form the differential signal.

An operation of the embodiment of the present invention will now be described with reference to FIGS. 2 and 3.

Referring to FIGS. 2 and 3, the one-column two-row vertical polarized wave directional antenna 1 and the two-column one-row vertical polarized wave directional antenna 8, which are oriented toward the same direction and have predetermined directivities respectively, and are adjustable in their wave angles, and also are rotated interlockingly with each other, output received signals corresponding to respective horizontal and vertical planes (hereafter each being referred to as an antenna pattern).

Figure 4:
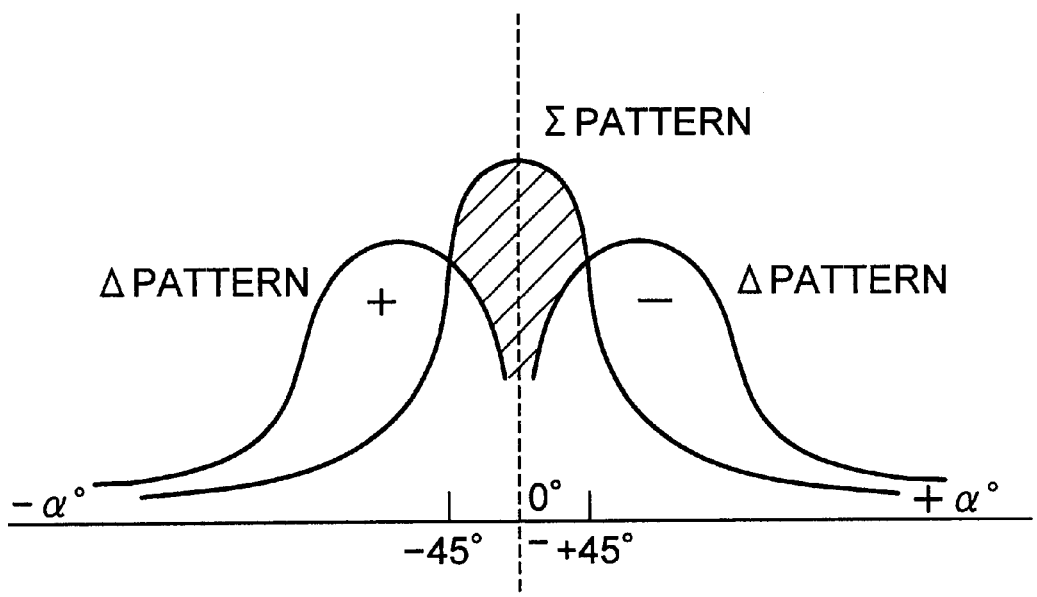
FIG. 4 is a schematic diagram illustrating an example of the Σ pattern and the Δ pattern.
Figure 5:
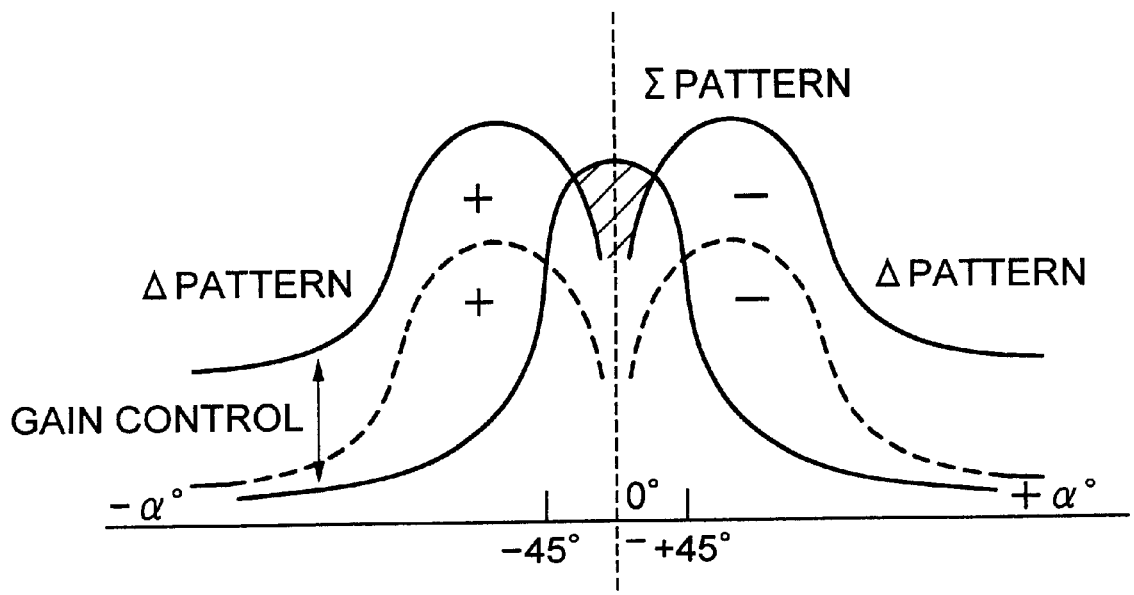
FIG. 5 is a schematic diagram illustrating a gain control operation of the Δ pattern.

Each of the antenna patterns of the respective directional antennas 1 and 8 is inputted to the phase sum and difference combining means 2 or 9 respectively and is divided into a summing signal output (hereafter referred to as a Σ pattern) formed by combining the received signals with a phase shifted by λ/4 to each other and a differential signal output (hereafter referred to as a Δ pattern) formed by combining them with a phase shifted by 3 λ/4 to each other. The antenna patterns of the respective directional antenna 1 and 8 are shown in FIGS. 4 and 5. In FIGS. 4 and 5, reference character α designates an azimuth angle.

Each of the Δ patterns outputted from the phase sum and difference combining means 2 and 9 is inputted to the gain control means 3 or 10 and after the gain is controlled, inputted to the receiving means 6 or 13 respectively. On the other hand, the Σ patterns are inputted to the receiving means 4 and 11 without any modification. The receiving means 4, 6 and the receiving means 11, 13 respectively output detection signals of the summing outputs or those of the differential outputs to the subtraction means 5 or 12. The subtraction means 5 and 12 respectively subtract the detection signals of the differential outputs from those of the summing outputs to generate angle properties of those differences (hereafter referred to as a Σ-Δ pattern), and respectively output the angle properties to the calculation means 7 or 14.

As is obvious from the Σ pattern and the Δ patterns shown in FIG. 4, a Σ-Δ pattern formed by a difference therebetween shows a steep variation in level in the vicinity of a front side of the antenna. This indicates that the beam width of the antenna is equivalently getting narrower than the Σ pattern. Accordingly, a highly accurate direction finding can be achieved by using an output corresponding to this Σ-Δ pattern. It should be noted that the Σ-Δ pattern can be shifted by employing an amplifier in the gain control means and thereby manually controlling or automatically controlling using AGC (automatic Gain Control) means a gain of the Δ pattern. The example is shown in FIG. 5. FIG. 5 shows that the higher Σ-Δ pattern indicates more steep directivity to obtain higher accuracy, and the lower Σ-Δ pattern indicates more moderate directivity. This gain control makes it possible to detect a maximum point of an arrival position of the radio wave.

Figure 6:
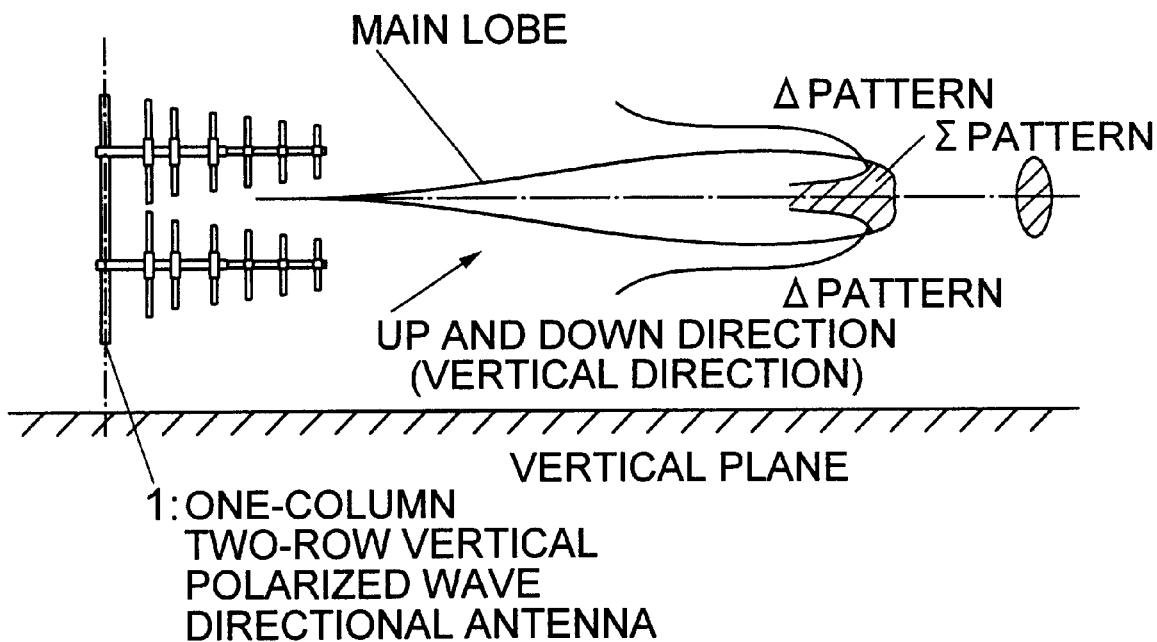
FIG. 6(a) is a schematic diagram illustrating a configuration of the Σ pattern and the Δ pattern of a directional pattern by a one-column two-row vertical polarized wave directional antenna viewed along an up and down direction (a vertical direction)
FIG. 6(b) is a schematic diagram illustrating a configuration of the Σ pattern and the Δ pattern of a directional pattern by a two-column one-row vertical polarized wave directional antenna viewed along a left and right direction (a horizontal direction)
Figure 6:
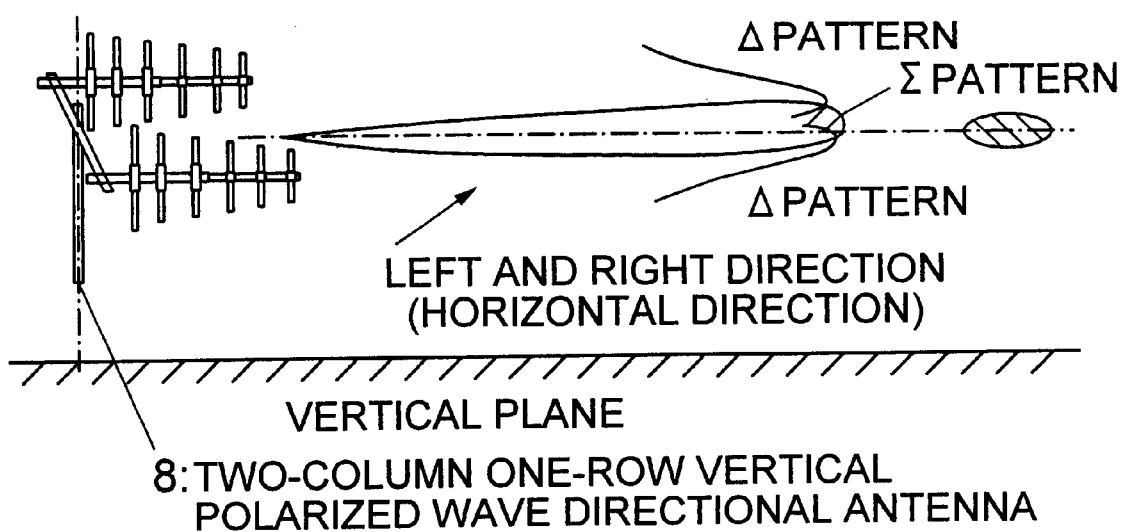

FIG. 6(a) shows a directivity of one-column two-row vertical polarized wave directional antenna 1 and FIG. 6(b) shows a directivity of two-column one-row vertical polarized wave directional antenna 8. The directivity is designated as being directed in up and down (vertical) direction and left and right (horizontal) direction. Because of the combination of the directional lines, the one-column two-row vertical polarized wave directional antenna 1 shows a steep shaped output of Σ-Δ pattern in its directivity along the up and down (vertical) direction. The two-column one-row vertical polarized wave directional antenna 8 shows a steep shaped output of Σ-Δ pattern in its directivity along the left and right (horizontal) direction. Combining these directivities allows to detect a desired point in a space.

An example of the detecting procedure of a direction of arrival and a position of an emission source of the radio wave will be described. The calculation means 7 and 14 shown in FIG. 1 respectively calculate the level of the Σ pattern as rotating the directional antennas 1 and 8 to determine the directions with the maximum levels thereof and thus to detect the direction of arrival of the radio wave. Further by controlling the outputs of the Δ pattern using the differential gain control means 3 and 10 as well as controlling the wave angles of the directional antennas 1 and 8, the position can be determined.

Figure 7A:
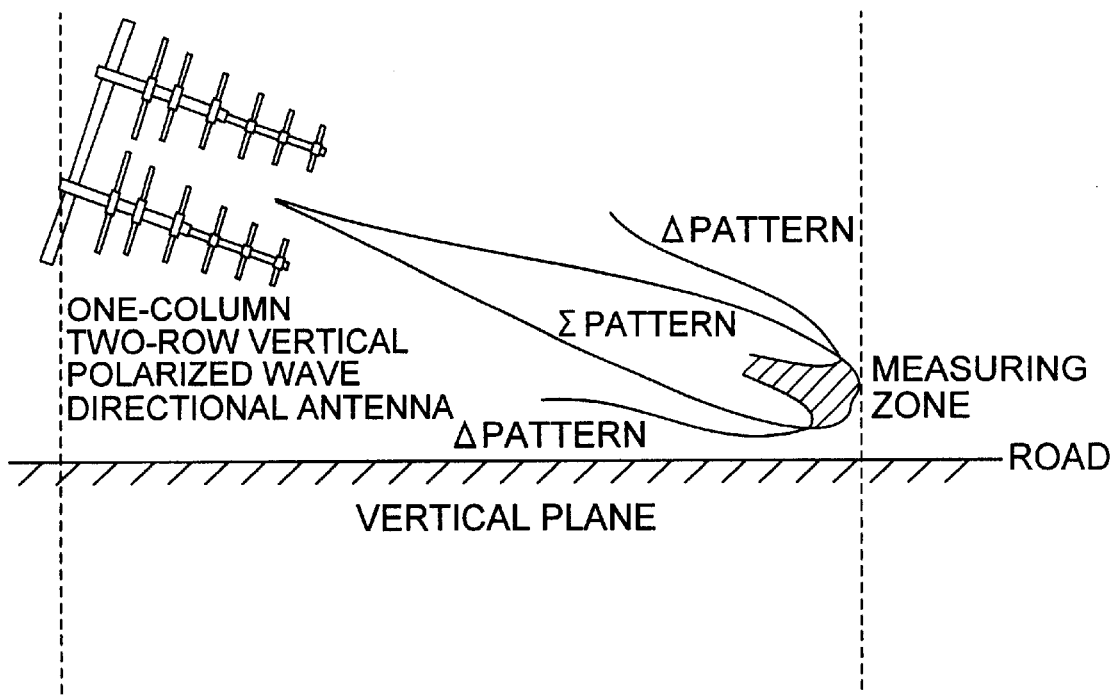
FIG. 7(a) is a schematic side elevational view illustrating an embodiment to determine a position by controlling a gain of Σ-Δ pattern.
Figure 7B:
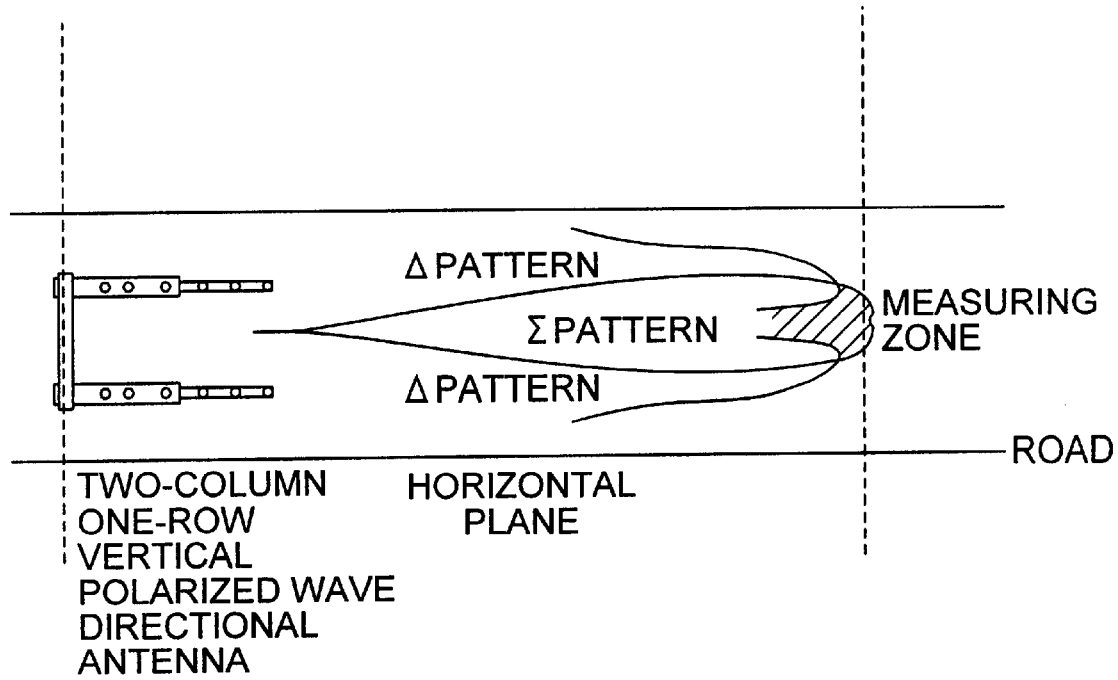
FIG. 7(b) is a schematic plan view illustrating an embodiment to determine a position by controlling a gain of Σ-Δ pattern.

FIG. 7 shows an embodiment for measuring a direction and a position of an emission source of an radio wave along an extending direction of a road by a direction and position finding apparatus in accordance with the present invention. In the drawing, the upper (a) is a side elevation view and the lower (b) is a plan view. As illustrated in the drawing, when a directional antenna is placed on a traffic lane of the road to measure along the extending direction of the road, the directional antenna is set to have a wave angle to determine a measuring range on the road surface. Controlling an azimuth angle to maximize the Σ pattern and controlling a gain of the Δ pattern allow to measure the position of the emission source of the radio wave. When a range on the road (a road width) is wider, the position of the emission source of the radio wave can be measured by horizontally rotating the antenna in the left and right direction.

Figure 8:
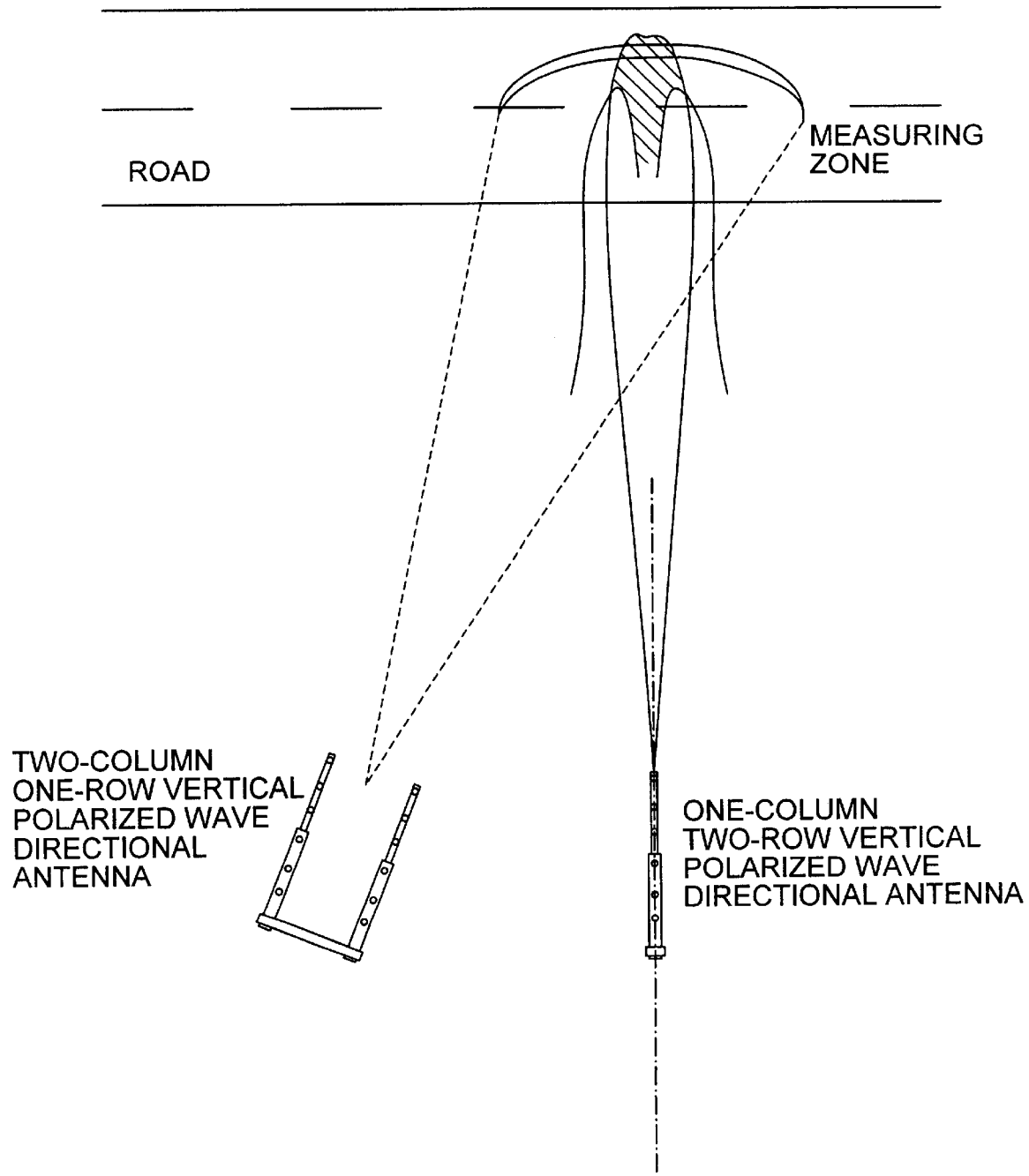
FIG. 8 is a schematic view illustrating another embodiment to determine a position by controlling a gain of Σ-Δ pattern.

FIG. 8 is a plan view illustrating alternative embodiment. For example, when the position of the emission source of the radio wave on the traffic lane of the road surface is to be determined from a certain measuring point away from the road, the measuring range can be determined by setting the directional antenna to have the wave angle. Then, controlling the wave angle to maximize the Σ pattern and controlling the gain of the Δ pattern allow to measure the position range of the emission source of the radio wave. Furthermore, controlling the wave angle of the directional antenna and horizontally rotating the antenna in the left and right direction allow to measure the position of the emission source of the radio wave in the wider range on traffic lane.

EFFECT OF THE INVENTION

As described above, since the apparatus according to the present invention is constructed so that the direction of arrival of the radio wave is determined by interlockingly rotating two directional antennas to maximize the Σ pattern of the directivity in each of the two directional antennas and the position of the emission source of the radio wave is determined by controlling the wave angle while controlling the gain of the Δ pattern output, such an advantageous effect can be obtained that a highly accurate direction and position finding operation can be performed with a simple antenna configuration.

What is claimed is:
1. A direction and position finding apparatus for radio wave comprising:
   a first directional antenna which rotates with a desired wave angle;
   a first phase sum and difference combining means for outputting a sum and a difference of outputs from said first directional antenna;
   a first differential gain control means for controlling a gain of the differential component of the output of said first directional antenna;
   a first receiving means for receiving the sum component from said first phase sum and difference combining means;
   a second receiving means for receiving an output from said first differential gain control means;
   a first subtraction means for subtracting one output from the other output of said first and said second receiving means;
   a first calculation means for determining a direction of arrival of radio wave based on an output from said first subtraction means;
   a second directional antenna which rotates with a desired wave angle;
   a second phase sum and difference combining means for outputting a sum and a difference of outputs from said second directional antenna;
   a second differential gain control means for controlling a gain of the differential component of the output from said second directional antenna;
   a third receiving means for receiving the sum component from said second phase sum and difference combining means;
   a fourth receiving means for receiving an output from said second differential gain control means;
   a second subtraction means for subtracting one output from the other output of said third and said fourth receiving means;
   a second calculation means for determining a direction of arrival of radio wave based on an output from said second subtraction means; and
   a position determining means for determining a position of an emission source of the radio wave based on outputs from said first and said second calculation means;
   wherein said first directional antenna and said second directional antenna rotate interlockingly.
2. A direction and position finding apparatus in accordance with claim 1, in which said directional antennas use at least two or more vertical polarized waves.
3. A direction and position finding apparatus in accordance with claim 1, in which said apparatus uses a vertical polarized wave directional antenna with acute horizontal directivity and a vertical polarized wave directional antenna with acute vertical directivity.
4. A direction and position finding apparatus in accordance with claim 1, in which each of said first and said second phase sum and difference combining means can vary a phase difference in the output from each of said directional antennas.
5. A direction and position finding apparatus in accordance with claim 1, in which the position of the emission source of the radio wave is determined by controlling the gain of the differential component of the output from the directional antenna.

* * * * *